Figure 1:
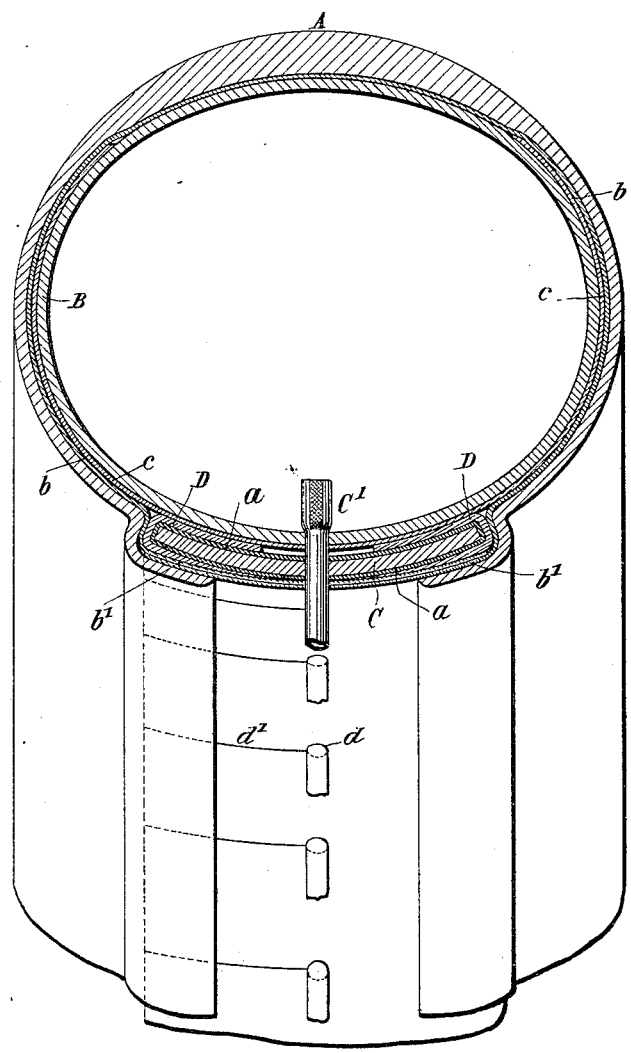

(No Model.) 2 Sheets—Sheet 1.
J. B. DUNLOP.
TIRE FOR VEHICLE WHEELS.

No. 453,550. Patented June 2, 1891.

Witnesses:
Raphael Netter
Robert Everett

Inventor
John Boyd Dunlop
by James L. Norris.
Attorneys.

(No Model.) 2 Sheets—Sheet 2.
J. B. DUNLOP.
TIRE FOR VEHICLE WHEELS.

No. 453,550. Patented June 2, 1891.

Witnesses:
Raphaël Netter
Robert Everett

Inventor
John Boyd Dunlop,
by James L. Norris.
Attorneys.

UNITED STATES PATENT OFFICE.

JOHN BOYD DUNLOP, OF BELFAST, ASSIGNOR TO THE PNEUMATIC TYRE AND BOOTH'S CYCLE AGENCY, LIMITED, OF DUBLIN, IRELAND.

TIRE FOR VEHICLE-WHEELS.

SPECIFICATION forming part of Letters Patent No. 453,550, dated June 2, 1891.

Application filed December 18, 1890. Serial No. 375,159. (No model.)

*To all whom it may concern:*

Be it known that I, JOHN BOYD DUNLOP, a subject of the Queen of Great Britain, residing at Belfast, Ireland, have invented certain new and useful Improvements in Tires for Wheels of Velocipedes and other Vehicles, of which the following is a specification, reference being had to the drawings accompanying and forming a part of the same.

This invention relates to pneumatic or inflated tires for the wheels of velocipedes and other vehicles, and more particularly to the special form of tire shown and described in my patent, No. 435,995, and the reissue thereof dated March 24, 1891. These tires are distinguished by an elastic inner tube, a surrounding and strengthening tube or jacket of canvas or other non-expansible material and an outer covering or coating of rubber on the tread or exposed portion of the tire. The tires are secured to the rim or felly of a wheel by means of flaps or free edges extending along the sides of the tire, which flaps are cemented or secured to the inner face of the rim of the wheel.

The improvements embraced in my present application consist in a novel process or method of constructing and applying tires of this description, and also in an improvement in the construction of the same which renders it more durable and serviceable.

The improvements in the process of manufacture consist, broadly, in forming independently in desired lengths the expansible or elastic tube and the composite non-expansible covering therefor, and then drawing the tube into the covering and cementing or securing together the ends of both to form the tire.

The improvements in the construction of the tire as an article reside in specific details and will be described more fully hereinafter.

In the drawings hereto annexed I have shown a portion of my complete tire and also detached parts of the same.

Figure 2:
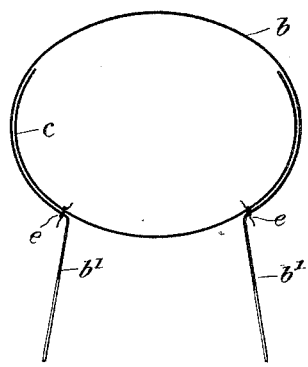
Figure 3:
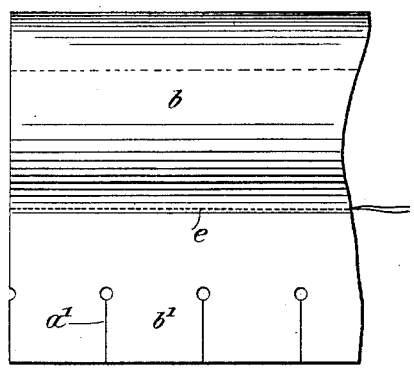
Figure 4:
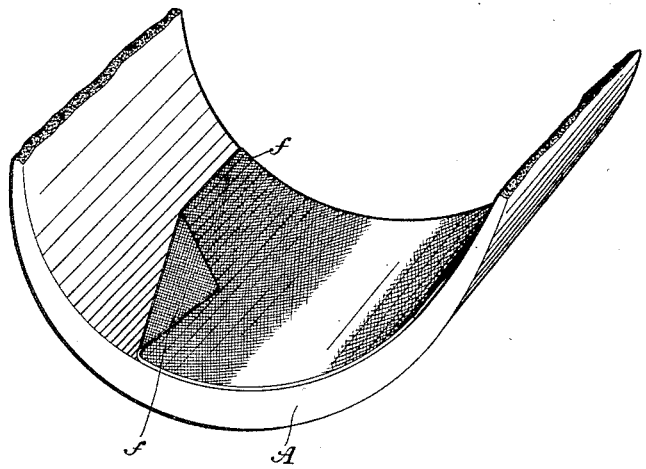

Figure 1 is a view mainly in section through the tire and wheel-rim and on an enlarged scale. Fig. 2 is a sectional view of the canvas or non-expansible covering. Fig. 3 is a side elevation of a part of the same. Fig. 4 is a perspective view of a portion of the outer covering of rubber.

The completed tire (shown in Fig. 1) when secured in place on a felly is constructed as follows:

A is an external or outer protective covering or layer of india-rubber which is thickened, as shown, at that portion which comes in contact with the ground.

B is an internal tube of india-rubber containing air or gas under pressure.

C is the metallic rim of the wheel, which is preferably somewhat flattened, as shown, to obtain a large bearing-surface. The metallic rim is enveloped in a protective strip $a$ of canvas or linen, as shown.

The inner tube of rubber B is surrounded and inclosed by a strengthening cover or jacket of canvas or like material, the several portions of which are designated by the letters $b\ c$, and this jacket is provided with free edges or flaps $b'$, which are carried around and cemented or secured to the inner face of the rim C to secure the tire in place.

The edges of the covered rim C may be covered with strips of rubber or like material D to prevent them from cutting or injuring the tire or its cover.

An automatic self-closing valve of suitable construction $C'$ passes up through the rim C and into the inner tube B, by means of which the tube is inflated.

The inner tube B is air-tight, and is prevented from expanding beyond a certain point by the non-expansible jacket which surrounds it. This jacket, in addition to its function of withstanding the pressure of air, serves also as the means of securing the tire to the wheel-rim C by the flaps $b'$, which overlap each other on the inner face of the rim. The edges of the flap $b'$ will be slitted, as at $d'$, on account of the spokes $d$. The edges of the india-rubber cover A are brought around the edges of the rim C and cemented to the inner face thereof, as shown.

In brief, then, the tire may be described as composed of an inner air-proof rubber tube B, a surrounding strip $c$, forming a more or less complete tube, a strip $b$, surrounding and inclosing the tube B, strip $c$, and rim C, and an outer layer or cover A, cemented onto the canvas strip or tube $b$. The canvas strips or folds $b$ and $c$ and the folds or edges enveloping the rim are all cemented together.

In general construction the tire thus described is the same as that set forth in my patent above referred to.

The improvements which distinguish my present invention are the following: The non-expansible cover is composed of a strip of canvas or other like material $c$ and a wider strip of the same material $b$, cemented together and stitched, as at $e$, along the lines of the edges of the rim C. I thus render any separation of the two strips along their line of union, when the tire is in position on the wheel, impossible or extremely difficult, and, moreover, admit of greater force being exerted by the operative when placing said tire in position upon the rim of the wheel, in which operation it is necessary to stretch the edges of the flaps tightly over the rim. I also place upon and cement to or mold on the internal surface of the external or outer rubber covering A and vulcanize therewith one or more layers or strips $f$ of canvas, cloth, or other fabric cut diagonally or on the bias, so that it is elastic or yielding in one direction, but practically inelastic or unyielding in the other. The said layer of canvas, cloth, or other fabric is so placed relatively to the external covering A that it will permit the giving or yielding thereof in a longitudinal direction, but will prevent or lessen the said giving or yielding thereof in a lateral direction, thereby obviating or greatly reducing the liability to damage of the tire when passing over uneven or rough surfaces. This layer of canvas or other material $f$, moreover, forms a better surface for the cement employed for uniting the covering A to the upper or outer part $b$ of the non-expansible jacket to take upon, and thus facilitates the obtaining of a good joint between the component layers of the tire.

In manufacturing or building up my improved tire the air-proof tube C and the canvas strengthening and confining cover or layer are formed separately in lengths and the air-proof tube is then drawn into the canvas cover and the respective ends of each are joined together and secured by means of cement. The edges or flaps $b$ are left free until the tire is placed on the rim, when they are carried around the inner face of the felly and overlapped and cemented firmly in position, as shown in the drawings. After the tire thus constructed is applied and secured to the rim of the wheel it is inflated by forcing air in through the valve C'.

Having now described my improvements, what I claim is—

1. The method or process of manufacturing and applying inflated tires, which consists in separately forming an air-proof tube and a non-expansible tubular covering, drawing the former into the latter, joining the respective ends of the two, applying and securing them to the rim of a wheel, and then inflating the air-proof tube, as set forth.

2. The method or process of manufacturing and applying inflated tires, which consists in forming a tubular non-expansible jacket or cover with longitudinal free edges or flaps, drawing therein an air-proof tube, joining their respective ends, securing the tire thus formed by cementing the flaps around the rim of a wheel, and then inflating the air-proof tube, as set forth.

3. The tire herein described, consisting in the combination of an inner inflated rubber tube, a surrounding cover composed of pieces of canvas cemented together and having free edges or flaps, lines of stitching along the line of junction of the flaps, and an outer covering or layer of india-rubber.

4. The tire herein described, consisting in the combination of an inner inflatable tube, a strengthening and confining cover of canvas, an outer layer of india-rubber, and a strip or strips of canvas cut on the bias and cemented to the inner face of the outer layer of rubber and to the periphery of the canvas cover, as set forth.

In testimony whereof I have hereunto signed my name in the presence of two subscribing witnesses.

JOHN BOYD DUNLOP.

Witnesses.
ARTHUR STEELE,
67 *High St., Belfast, Writing Clerk.*
GEORGE BAXTER,
*Writing Clerk,* 71 *Grosvenor St., Belfast.*